| (12) | United States Patent | (10) Patent No.: | US 8,881,858 B2 |
|---|---|---|---|
| | Ishii et al. | (45) Date of Patent: | Nov. 11, 2014 |

(54) FRONT WHEEL SUPPORTING STRUCTURE FOR STRADDLE-TYPE VEHICLE

(71) Applicant: Kawasaki Jukogyo Kabushiki Kaisha, Hyogo (JP)

(72) Inventors: Hiroshi Ishii, Kobe (JP); Daisuke Saeki, Kakogawa (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 14/104,174

(22) Filed: Dec. 12, 2013

(65) Prior Publication Data

US 2014/0167382 A1 Jun. 19, 2014

(30) Foreign Application Priority Data

Dec. 13, 2012 (JP) ................................. 2012-272651

(51) Int. Cl.
| B62K 11/00 | (2006.01) |
| B62K 21/18 | (2006.01) |
| B62K 25/04 | (2006.01) |
| B62K 25/24 | (2006.01) |
| B62K 11/04 | (2006.01) |

(52) U.S. Cl.
CPC ............. *B62K 25/24* (2013.01); *B62K 2201/04* (2013.01); *B62K 2201/08* (2013.01); *B62K 11/04* (2013.01)
USPC ............................ 180/219; 280/276; 280/283

(58) Field of Classification Search
USPC .......... 180/219, 227; 280/275, 276, 277, 279, 280/280, 283
See application file for complete search history.

(56) References Cited

U.S. PATENT DOCUMENTS

| 4,265,329 | A | * | 5/1981 | de Cortanze | 180/219 |
| 4,526,249 | A | * | 7/1985 | Parker | 180/219 |
| 4,561,519 | A | * | 12/1985 | Omori | 180/227 |
| 4,712,638 | A | * | 12/1987 | Kawaguchi et al. | 180/219 |
| 4,723,621 | A | * | 2/1988 | Kawano et al. | 180/219 |
| 4,821,833 | A | * | 4/1989 | Yamaguchi | 180/219 |
| 5,014,808 | A | * | 5/1991 | Savard et al. | 180/219 |
| 5,069,303 | A | * | 12/1991 | Fuller | 180/219 |
| 5,417,305 | A | * | 5/1995 | Parker | 180/219 |
| 7,806,217 | B2 | * | 10/2010 | Hasegawa et al. | 180/219 |
| 7,896,379 | B2 | * | 3/2011 | Nagao et al. | 280/276 |
| 2008/0236923 | A1 | | 10/2008 | Hasegawa et al. | |

FOREIGN PATENT DOCUMENTS

| FR | 2 610 589 | 8/1988 |
| GB | 2 191 158 | 12/1987 |
| JP | 62-175284 | 7/1987 |
| JP | 4833901 | 9/2011 |

OTHER PUBLICATIONS

European Search Report (ESR) issued Mar. 28, 2014 in corresponding European Patent Application No. EP 13 19 7116.

* cited by examiner

*Primary Examiner* — Joseph M Rocca
*Assistant Examiner* — Marc A Scharich
(74) *Attorney, Agent, or Firm* — Wenderoth, Lind & Ponack, L.L.P.

(57) ABSTRACT

A front wheel supporting structure for a vehicle includes a front arm for supporting a front axle and a suspension mechanism for resiliently suppressing vertical swinging motion of the front arm. The suspension mechanism includes a damper member disposed along a lateral direction between a head pipe and the front arm, and a connecting member for connecting the front arm with the damper member such that vertical swinging motion of the front arm is converted into lateral motion of the damper member.

13 Claims, 5 Drawing Sheets

FRONT WHEEL SUPPORTING STRUCTURE FOR STRADDLE-TYPE VEHICLE

BACKGROUND OF THE INVENTION

1. Field of the Invention

The present invention relates to a front wheel supporting structure for a vehicle which supports a front wheel by a front arm in a swing arm manner and which has a suspension mechanism for suppressing swinging motion of the front wheel.

2. Description of the Prior Art

A conventional technique of the swing arm manner is described in JP 4833901 B1. A front arm which supports a front wheel is supported on a front lower end of a vehicle body frame such that the front arm can swing in the vertical direction. A damper member (cushion unit) of a suspension mechanism for the front wheel is disposed along a vehicle-width direction. The damper member is disposed on a lower side of the front arm.

According to the conventional structure, since the damper member is disposed on the lower side of the front arm along the vehicle-width direction, a height of the damper member from a road surface becomes low, and a large bank angle cannot be secured. Further, a distance from the damper member to an arm supporting portion is long and a structure thereof becomes complicated.

SUMMARY OF THE INVENTION

The present invention has been accomplished in view of the problems, and it is an object of the present invention to provide a front wheel supporting structure for a vehicle of a swing arm manner, capable of shortening a distance from the front arm to the damper member, capable of enhancing responsiveness of the damper member, and capable of securing a large bank angle.

To solve the above problems, the present invention provides a front wheel supporting structure for a vehicle including: a front arm for supporting a front axle, the front arm extending rearward from a front axle supporting portion and being able to swing in a vertical direction; and a suspension mechanism for resiliently suppressing vertical swinging motion of the front arm, wherein the suspension mechanism includes a damper member disposed along a lateral direction between upper and lower directions of a head pipe and the front arm, the head pipe supports handlebars such that the handlebars can angularly move, and the suspension mechanism further includes a connecting member for connecting the front arm and the damper member to each other such that vertical swinging motion of the front arm is converted into lateral expanding and contracting motion of the damper member.

According to this invention, in the front wheel supporting structure for a vehicle including the front arm of a swing arm manner, a size of the vehicle in the longitudinal direction can be reduced, a distance between the damper member and the front arm can be shortened, and it is possible to enhance responsiveness of the damper member to vertical movement of the front wheel.

A pebble which is flicked during running is less prone to hit the damper member, a barycenter of the vehicle does not become low more than necessary, and a large bank angle can be secured for a vehicle.

In the present invention, it is possible to employ the following configurations in addition to the front wheel supporting structure.

(a) The damper member is located to rearward of the front wheel and the head pipe.

According to this configuration, it is possible to further shorten the distance between the damper member and the front arm, and to further enhance the responsiveness of the damper member.

(b) The front wheel supporting structure further includes a link mechanism which supports the front arm on a vehicle body-configuring member, wherein the connecting member is connected to the front arm.

According to this configuration, since a load applied to the link member when the brake is applied is reduced, the link members can be made thin, and a weight thereof can be reduced.

(c) The front wheel supporting structure further includes one more front arm and one more connecting member. The pair of front arms is respectively disposed on left and right sides of the front wheel supporting structure, the pair of connecting members is respectively disposed on left and right sides of the front wheel supporting structure, and the left and right connecting members are respectively connected to left and right ends of the damper member.

According to this configuration, it is possible to support left and right sides of the front arm substantially uniformly, rigidity of the front arm is enhanced, and twist can be prevented.

(d) The connecting member is a bell crank member, and an input end of the bell crank member is located on a more outer side in a vehicle-width direction than the both ends of the damper member in a vehicle-width direction.

According to this configuration, the distance from the front arm to the damper member can be shortened, the bell crank member can be operated without interfering with other members, and it becomes easy to secure a swinging stroke of the front arm.

In short, according to the present invention, a size of the vehicle in the longitudinal direction can be reduced, the distance from the front arm to the damper member can be shortened, responsiveness of the damper member can be enhanced, and a large bank angle can be secured.

BRIEF DESCRIPTION OF THE DRAWINGS

The above and other objects, features and advantages of the present invention will be become more apparent from the following description taken in connection with the accompanying drawings, in which.

DETAILED DESCRIPTION OF THE PREFERRED EMBODIMENTS

[First Embodiment of the Invention]

Figure 1:
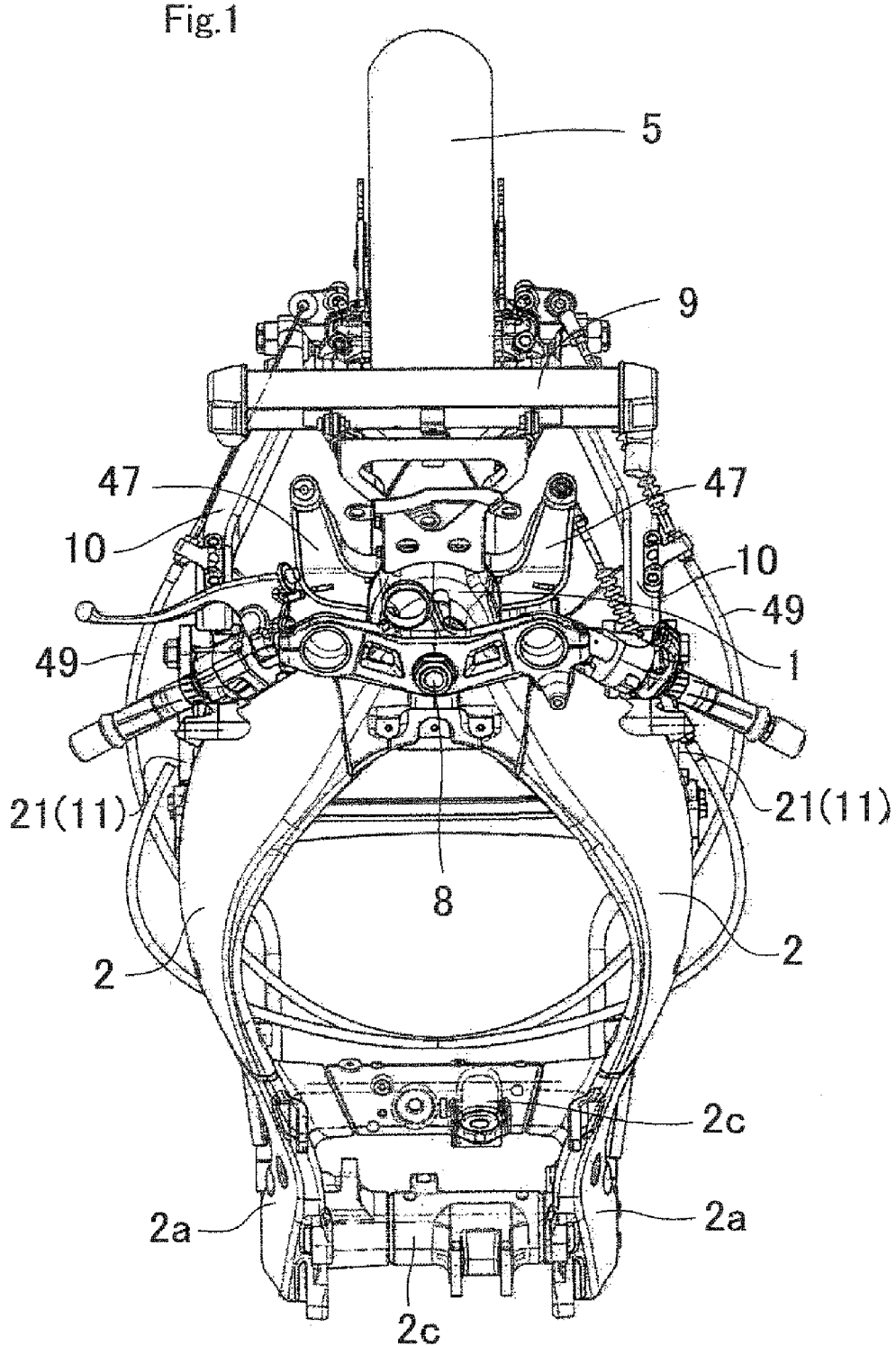
FIG. 1 is a plan view of a two-wheeled motor vehicle according to the present invention.
Figure 2:
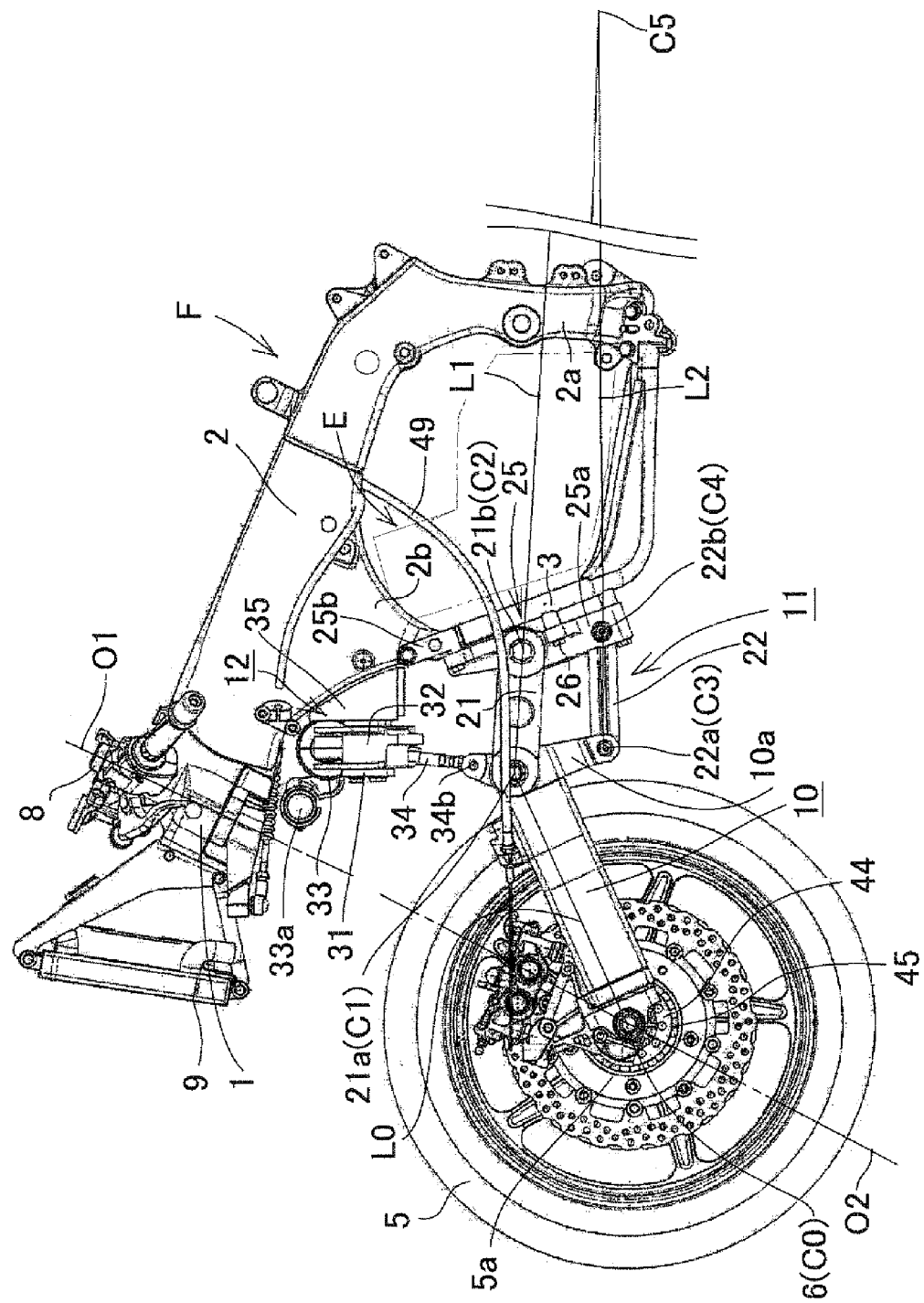
FIG. 2 is a left side view of the two-wheeled motor vehicle in FIG. 1.

FIGS. 1 to 6 show a two-wheeled motor vehicle (a motorcycle) to which the present invention is applied, and an embodiment of the present invention will be described based on these drawings. FIG. 2 is a left side view of the two-wheeled motor vehicle. In FIG. 2, a vehicle body frame F includes a head pipe (head box) 1 which supports a steering shaft 8 connected with handlebars, a pair of left and right main frame members 2, and a pair of left and right down tubes 3. The head pipe 1 supports the handlebars through the steering shaft 8 such that the handlebars can angularly move. Each of the main frame members 2 is a rigid member having a rectangular vertical cross section, and the main frame member 2 is integrally formed together with the head pipe 1 by aluminum casting. The main frame member 2 straightly extends rearward and downward from the head pipe 1. A swing arm bracket 2a is integrally formed on a rear end of the main frame member 2. The swing arm bracket 2a extends downward. A mount portion 2b is formed on a lower surface of a front end of the main frame member 2 such that the mount portion 2b projects downward. The mount portion 2b has an inverted triangular shape as viewed from the side of the vehicle. Each of the down tubes 3 is connected to a lower end of the mount portion 2b, and extends substantially downward. A lower end of the down tube 3 is curved rearward, and a rear end of the down tube 3 is couple to a lower end of the swing arm bracket 2a. An internal combustion engine (engine) E is mounted in a space surrounded by the main frame members 2 and the down tubes 3 as a power unit which becomes a running driving source. The internal combustion engine E is supported by the vehicle body frame F. An electric motor may be mounted instead of the internal combustion engine E. A radiator 9 for engine coolant is mounted in front of the head pipe 1.

A front wheel supporting mechanism which supports a front wheel 5 includes a pair of left and right front arms 10 for supporting the front axle 6, parallel link mechanisms 11 composed of a pair of left and right upper link members 21 and a pair of left and right lower link members 22, and a suspension mechanism 12 for the front wheel for suppressing vertical swinging motion of the front wheel 5. A front axle 6 is fixed to a front end of a front arm 10 by bolts 29 (FIG. 3) which extends in the longitudinal direction.

[Configuration of Front Arm 10]

In FIG. 2, the front arm 10 extends substantially rearward and upward from a front axle supporting portion. A rear end portion 10a of each of the front arms 10 is located rearward of a rear end of the front wheel 5, and bends downward into an L-shape from a main body of the front arm 10. In this embodiment, the rear end portion 10a is formed as a member which is independent from the main body of the front arm 10 and is fixed to a rear end of the main body of the front arm 10, but in the present invention, it is also possible to integrally form the rear end portion 10a and the main body of the front arm 10 together. No matter which method is employed, in this embodiment, the front arm 10 including the rear end portion 10a is formed into the L-shape as viewed from the side of the vehicle, and is formed as a rigid member.

The front arm 10 is formed such that an axis L0 of the front arm 10, which connects a core (a center line) C0 of the front axle 6 and a front fulcrum C1 of the upper link member 21 to each other, inclines rearward and upward with respect to a horizontal line. Above the front fulcrum C1 is a connecting point between the rear end 10a of the front arm 10 and the front end of the upper link 21. That is, the main body of the front arm 10 inclines upward as tending rearward, and an angle formed between the axis L0 of the front arm 10 and the horizontal line is set smaller than 45 degrees. The front arm 10 is formed longer than the link members 21 and 22 in the longitudinal direction.

In a plan view of the two-wheeled motor vehicle shown in FIG. 1, the front arm 10 inclines outward in a vehicle-width direction as tending rearward, while taking a steering angle of the front wheel into consideration. More specifically, the front arm 10 includes an inclined portion which inclines outward in the vehicle-width direction as tending rearward, and a parallel portion connected to a rear end of the inclined portion and extending parallel to a plane which extends in the longitudinal direction. The rear parallel portion extends to rearward of a rear end of the wheel.

Figure 3:
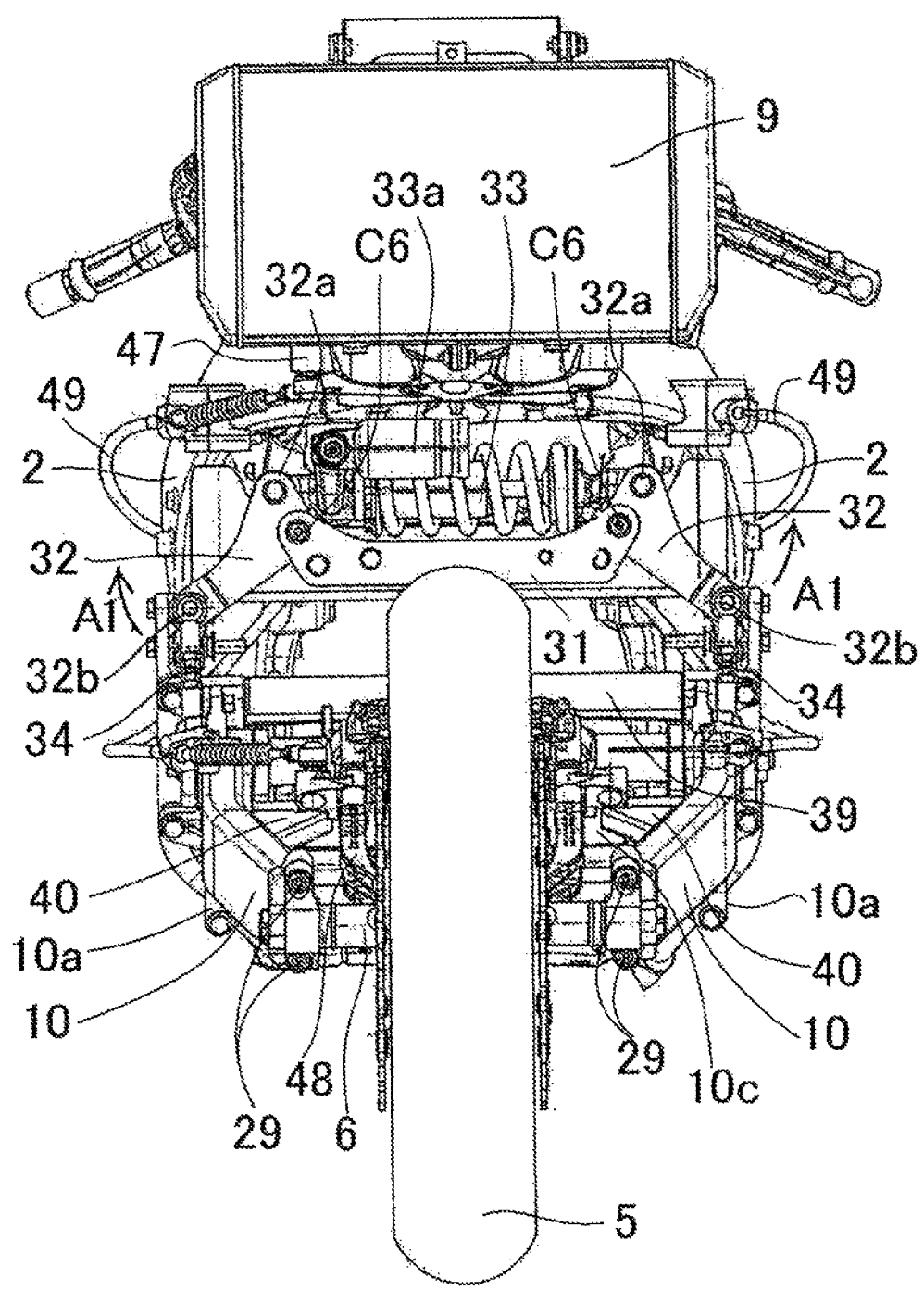
FIG. 3 is a front view of the two-wheeled motor vehicle in FIG. 1.

FIG. 3 is a front view of the two-wheeled motor vehicle. The pair of left and right rear ends 10a of the front arms 10 is each other connected through a laterally extending cross portion 10c behind the front wheel 5. According to this, rigidity of the front arm 10 is enhanced. Further, a cross section of the front arm 10 is formed into a substantially rectangular shape which is long in the vertical direction, and this configuration further enhances the rigidity. Connected portions between the cross portion 10c and the left and right front arms 10 are integrally provided with triangular reinforcing plates 40. According to this, rigidity of the left and right front arms 10 is further enhanced.

[Configuration of Link Mechanism 11]

In FIG. 2, front ends of the upper link member 21 and the lower link member 22 are connected to the upper and lower ends of each of the rear ends 10a of the front arms 10 through front fulcrum pins 21a and 22a such that the front ends of the link members 21 and 22 can turn around pin axes of the front fulcrum pins 21a and 22a. The upper link member 21 and the lower link member 22 extend rearward substantially parallel to each other. A rear end of the upper link member 21 and a rear end of the lower link member 22 are connected to each of link supporting brackets 25 through rear fulcrum pins 21b and 22b such that the rear ends of the link members 21 and 22 can turn around pin axes of the rear fulcrum pins 21b and 22b. Each of the link supporting brackets 25 is detachably fixed to front surfaces of the down tubes 3 through bolts 26. The pair of left and right parallel link mechanisms 11 extends rearward substantially straightly and parallel to each other in a state where a constant distance is maintained between the link mechanisms 11 in the vehicle-width direction.

A pitch between the front and rear fulcrums C1 and C2 of the upper link member 21 and a pitch between the front and rear fulcrums C3 and C4 of the lower link member 22 are substantially equal to each other, and the upper link member 21 and the lower link member 22 are disposed substantially parallel to each other as described above. Strictly speaking, however, the lower link member 22 is disposed substantially horizontally, but the upper link member 21 is disposed such that a rear portion thereof is slightly lowered. In other word, a pitch in the vertical direction between the rear fulcrum C2 of the upper link member 21 and the rear fulcrum C4 of the lower link member 22 is slightly shorter than a pitch in the vertical direction between the front fulcrum C1 of the upper link member 21 and the front fulcrum C3 of the lower link member 22. According to this, a line L1 connecting the front and rear upper fulcrums C1 and C2 to each other and a line L2 connecting the front and rear lower fulcrums C3 and C4 to each other intersect with each other at a rear intersection point C5. Therefore, the front wheel 5 and the front axle 6 swing in the vertical direction around the intersection point C5 as a fulcrum. A position of the front axle 6 in the vertical direction is substantially the same as heights of the lower fulcrum pins 22a and 22b of the parallel link mechanism 11 in a state where no one rides on the vehicle.

A line (L0-L1) which connects the core C0 of a front axle 6, the front fulcrum C1 of the upper link member 21 and the rear fulcrum C2 of the upper link member 21 to each other has an inverted-V shape. The front arm 10 and the upper and lower link members 21 and 22 are connected to each other such that they can angularly move. Accordingly, the front arm 10 can swing in the vertical direction together with the upper and lower link members 21 and 22.

The upper and lower link members 21 and 22 extend in the longitudinal direction substantially parallel to each other as described above. The upper link member 21 is formed such that its rigidity in a compression direction is greater than that of the lower link member 22. More specifically, a cross section shape of the upper link member 21 which is perpendicular to an axis L1 is greater than a cross section shape of the lower link member 22 which is perpendicular to an axis L2. Further, the upper link member 21 is disposed in a region closer to an extended line of the axis L0 of the front arm 10 than the lower link member 22. The upper link member 21 is formed into such a shape that a resistance force (compression force) from a road surface can sufficiently be propagated from the front arm 10 to the link supporting bracket 25.

Figure 4:
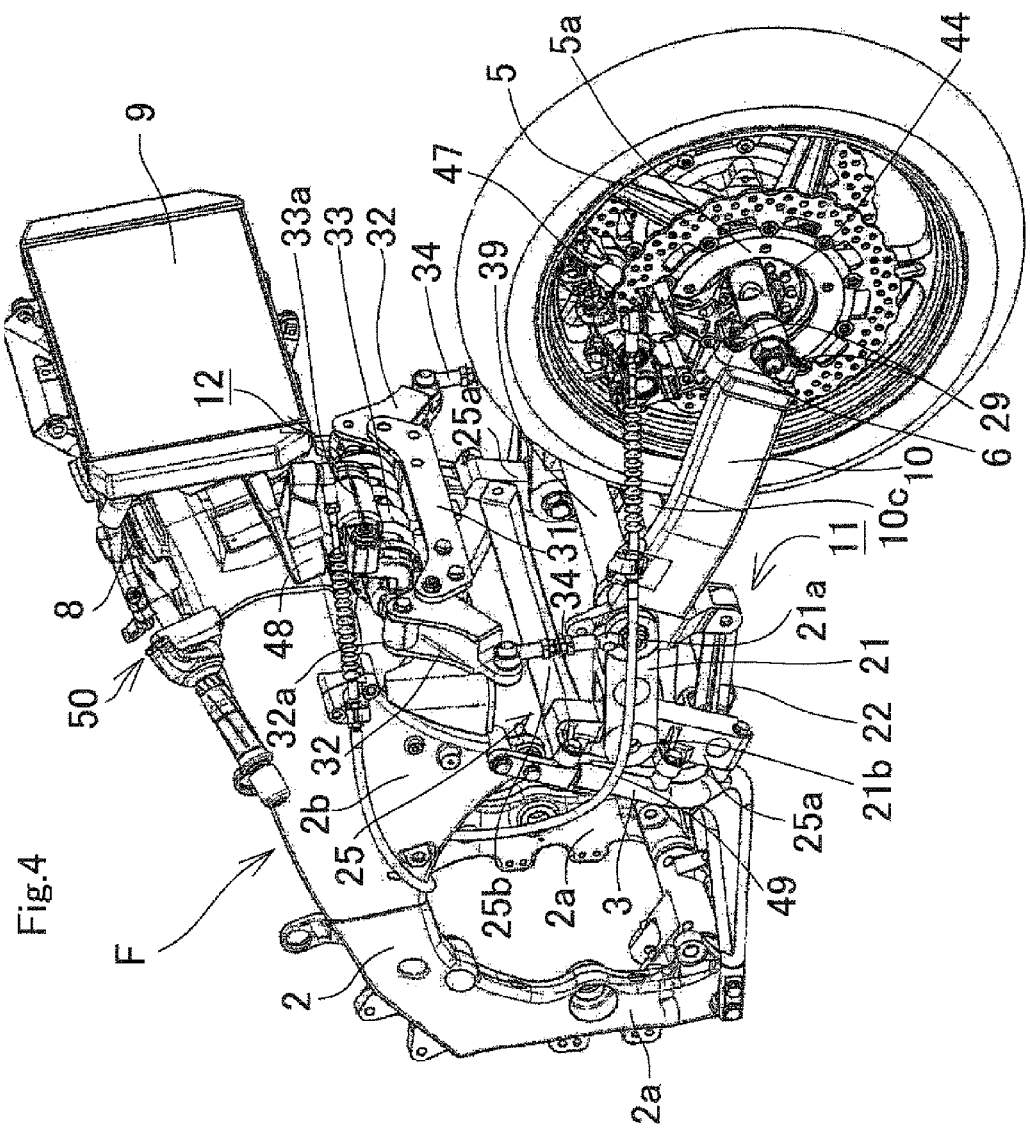
FIG. 4 is a perspective view of the two-wheeled motor vehicle in FIG. 1 as viewed from front and above.

FIG. 4 is a perspective view of the two-wheeled motor vehicle. In FIG. 4, the link supporting brackets 25 include a pair of left and right rail members 25a which extend in the vertical direction and which connect the upper and lower link members 21 and 22 to each other, and a connecting member 25b which extends in the vehicle-width direction and which connects both the rail members 25a to each other. Upper and lower ends of the link supporting bracket 25 are respectively connected to upper and lower ends of the down tubes 3 of the vehicle body frame F.

Structures of the upper and lower link members 21 and 22 and a connecting structure of the front and rear ends of the link members 21 and 22 will be described in detail.

In FIG. 4, a distance between the lower link members 22 of the parallel link mechanism 11 in the vehicle-width direction is shorter than a distance between the upper link members 22 in the vehicle-width direction. In other words, each of the lower link members 22 is located on a more inner side in the vehicle-width direction than each of the upper link members 21.

The upper and lower link members 21 and 22 and the front arm 10 are turnably connected to each other in such a manner that front ends of the upper link members 21 which are formed into U-shapes as viewed from above cover the rear ends of the front arms 10 from both sides in the vehicle-width direction, and the fulcrum pins 21a are inserted into through holes which penetrate the link members 21 and 22 and the front arms 10 in the lateral direction. By covering the front arms 10 with the upper link members 21 from both sides in the vehicle-width direction in this manner, inner side portions of the upper link members 21 located on inner sides of the pair of front arms 10 can be connected to each other through a cross member 39. It is also possible to employ such a configuration that the rear ends of the front arms 10 are formed into U-shapes as viewed from above to cover the both sides of the upper link members 21 in the vehicle-width direction.

Similarly, in this embodiment, the link members 21 and 22 and the link supporting brackets 25 are turnably connected to each other in such a manner that the rear ends of the upper link members 21 which are formed into U-shapes as viewed from above cover upper ends of the link supporting brackets 25 from both sides in the vehicle-width direction, and the pins 21b are inserted into through holes which penetrate the link members 21 and 22 and the link supporting brackets 25 in the lateral direction. Of course, it is also possible to employ such a configuration that the upper ends of the link supporting brackets 25 are formed into U-shapes to cover the both sides of the upper link members 21 in the vehicle-width direction.

Figure 5:
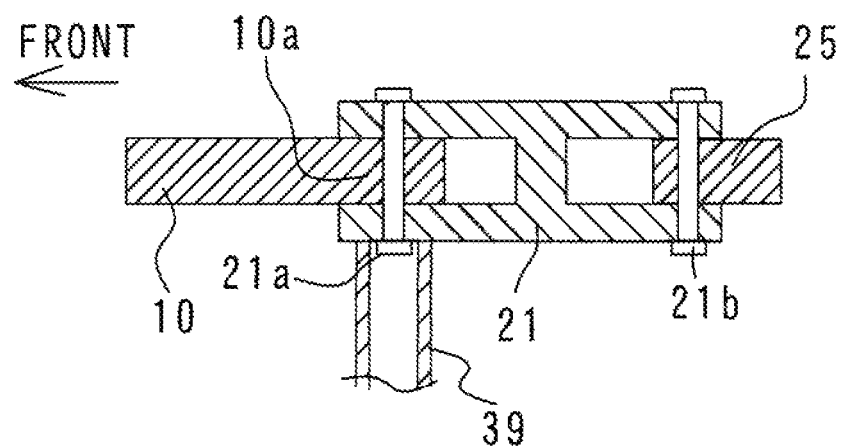
FIG. 5 is an enlarged plan view of an upper link member.

FIG. 5 is a plan view of one of the left and right upper link members 21. The upper link member 21 is formed into an H-shape as viewed from above. As already described above, the bifurcated-shaped front end of each of the upper link members 21 sandwiches the rear end 10a of the front arm 10 from left and right sides, and is turnably coupled to the rear end 10a through the upper front fulcrum pin 21a. Similarly, the bifurcated-shaped rear end of the upper link member 21 sandwiches the link supporting bracket 25 from left and right sides, and is turnably coupled to the link supporting bracket 25 through the upper rear fulcrum pin 21b.

Figure 6:
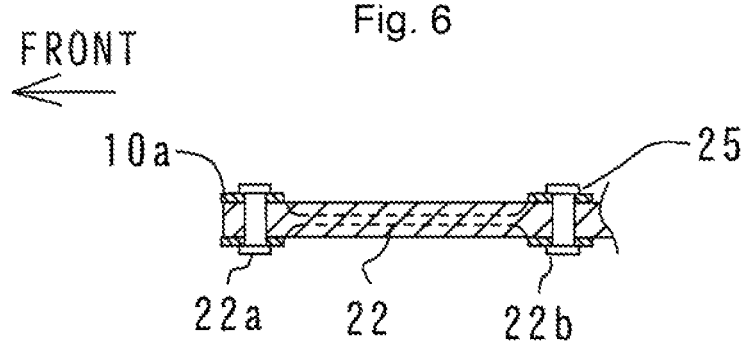
FIG. 6 is an enlarged plan view of a lower link member.

FIG. 6 is a plan view of one of the left and right lower link members 22. The lower link member 22 is formed into an I-shape as viewed from above, and a front end of the lower link member 22 is sandwiched by the bifurcated-shaped rear end 10a of the front arm 10 from left and right sides, and is turnably coupled to the rear end 10a through the lower front fulcrum pin 22a. Similarly, the rear end of the lower link member 22 is sandwiched by the bifurcated-shaped link supporting bracket 25 from left and right sides, and is turnably coupled to the link supporting bracket 25 through the lower rear fulcrum pin 22b.

[Configuration of Suspension Mechanism 12]

In FIG. 4, the suspension mechanism 12 includes a supporting bracket 31 which is fixed to the frame F and which has a U-shaped cross section extending along the vehicle-width direction, a pair of left and right bell crank members (connecting members) 32 which is turnably supported by both vehicle-widthwise ends of the supporting bracket 31, a damper member 33 disposed above the supporting bracket 31 along the vehicle-width direction, and a pair of left and right tie rods 34 which connects lower ends of the bell crank members 32 and upper surfaces of the rear ends 10a of the front arms 10 to each other.

In FIG. 2, in this embodiment, the front arm 10 is disposed such that the line L0 and a line connects the front fulcrum C1 of the upper link member 21 and a lower end connecting shaft 34b of the tie rod 34 to each other bend. Above the line L0 connects the axis C0 of the front axle 6 and the front fulcrum C1 of the upper link member 21 to each other. The front axle 6, the front fulcrum C1 and the lower end connecting shaft 34b of the tie rod 34 extend in the lateral direction. Therefore, a lever ratio can be adjusted by appropriately setting positions of the shafts and fulcrums.

The supporting bracket 31 is located substantially directly above the rear end 10a of the front arm 10 as viewed from the side of the vehicle. A mounting stage 35 is integrally fixed to a rear surface of the supporting bracket 31. The mounting stage 35 is fixed to a front end of the mount portion 2b of the vehicle body frame F by welding, or detachably fixed thereto through a bolt or the like.

The damper member 33 is a coilover unit formed by combining a coil spring and a hydraulic damper (hydraulic cylinder), and the damper member 33 is disposed substantially directly above the rear end 10a of the front arm 10 together with the supporting bracket 31. More specifically, the damper member 33 is located in a space between an upper surface of the front arm 10 and a lower surface of the head pipe 1, located substantially directly above the rear end 10a of the front arm 10, and located to rearward of the head pipe 1 and the steering shaft 8.

In FIG. 3, a length of the damper member 33 is set to such a value that the damper member 33 falls within a range located on a more inner side in the vehicle-width direction than outer edges of the left and right main frame members 2 in the vehicle-width direction. The damper member 33 is disposed in front of and above an exhaust port and an exhaust pipe of the engine. Accordingly, it is possible to prevent the damper from being heated by heat which is generated in an exhaust system.

Each of the left and right bell crank members 32 includes an upper arm portion 32a which projects upward from a turning fulcrum C6, and a lower arm portion 32b which projects obliquely downward. The bell crank member 32 is supported such that it can angularly move around the turning fulcrum C6. An output shaft is set on an upper end of the upper arm portion 32a. The upper arm portion 32a is connected to operating portions on both ends of the damper member 33 such that the upper arm portion 32a can angularly move around the output shaft. An input shaft is set on the lower arm portion 32b. The lower arm portion 32b is connected to an upper end of the tie rod 34 such that the lower arm portion 32b can angularly move around the input shaft.

In this embodiment, each of the bell crank members 32 is formed, as its name suggests, such that a line which connects the output shaft of the upper arm portion 32a and the turning fulcrum C6 to each other, and a line which connects the input shaft of the lower arm portion 32b and the turning fulcrum C6 to each other bend. The turning fulcrum C6, the lower input shaft and the upper output shaft extend in the longitudinal direction.

The damper member 33 is resiliently expanded and contracted in the vehicle-width direction (length direction of the damper member) by turning motion of both the bell crank members 32 around the fulcrum C6. It is possible to adjust a lever ratio which is a variation ratio of an input end of the damper member 33 with respect to displacement of the front arm 10 by appropriately setting positions of the turning fulcrum C6 of the bell crank member 32, the output shafts and the input shafts of the upper and lower arm portions 32a and 32b.

An input-side lower end (input shaft) of each of the bell crank members 32 is located on a more outer side in the vehicle-width direction than the turning fulcrum C6 of the bell crank member 32, and is located on a more outer side than the end of the damper member 33 in the vehicle-width direction.

In FIG. 4, the output-side upper arm portion 32a of the bell crank member 32 is composed of bifurcated-shaped wall portions, and the upper arm portion 32a is connected to the damper member 33 in a state where ends of the damper member 33 in the vehicle-width direction is sandwiched between the bifurcated-shaped wall portions.

A reserve tank 33a is located on a front side of the damper member 33 and above this front side, disposed substantially parallel to the damper member 33, and mounted on a main body of the damper member 33.

An upper end of each of the tie rods 34 is turnably connected to a lower end of the bell crank member 32 through a ball joint (pillow ball), and a lower end of the tie rod 34 is turnably connected to an upper surface of the rear end 10a of the front arm 10 through a ball joint. That is, as shown in FIG. 2, the tie rod 34 is connected to the rear end 10a of the front arm 10 such that the tie rod 34 can angularly move around a core of a connecting shaft 34b which extends in the vehicle-width direction.

Both the tie rods 34 are disposed substantially perpendicular to a horizontal plane. Lengths of the tie rods 34 can individually be adjusted by screw structures like so-called turn buckles.

In this embodiment, directions (vehicle-width directions) of the rear end 10a of the front arm 10 and the lower end of the tie rod 34, and a direction (longitudinal direction) of the input shaft of the lower arm portion 32b of the bell crank member 32 are different from each other, and their moving directions are also different from each other. Therefore, the upper and lower ends of the tie rod 34 are connected to both the front arm 10 and the bell crank member 32 through the ball joints. Accordingly, power can be transmitted as described above.

A steering mechanism will be described below. In FIG. 4, the front wheel 5 is rotatably supported by a so-called hub-steering mechanism such that the front wheel 5 can be steered laterally with respect to the front axle 6. Although a general hub-steering mechanism is known, this mechanism will be described briefly below. In FIG. 2, a wheel-side steering shaft (not shown) is fixed to the front axle 6. The wheel-side steering shaft is perpendicular to the front axle 6 at right angles. The wheel-side steering shaft has a core O2 which is substantially parallel to a core O1 of the handlebars-side steering shaft 8 or matches with the core O1. A hub supporting cylinder shaft 44 is supported by the wheel-side steering shaft such that the hub supporting cylinder shaft 44 can be steered laterally, and a hub 5a of the front wheel 5 is rotatably supported by an outer periphery of the hub supporting cylinder shaft 44 through a bearing 45. That is, the front wheel 5 can be steered laterally together with the hub supporting cylinder shaft 44 with respect to the front axle 6, and the front wheel 5 rotates with respect to the hub supporting cylinder shaft 44.

In FIG. 4, wire connecting portions 47 for steering are provided on left and right ends of the hub supporting cylinder shaft 44. A steering wire 49 is attached between the wire connecting portions 47 and a handlebars-side bracket 48 which is laterally steered integrally with the handlebars-side steering shaft 8. That is, the hub supporting cylinder shaft 44 and the front wheel 5 are laterally steered through the steering wire 49 by a lateral steering operation of the handlebars 50.

In FIG. 2, a connecting structure of an end of the steering wire 49 on the side of the wheel is omitted.

An operation will be described. In FIG. 2, when the vehicle runs on a bumpy road, the front wheel 5, the front axle 6 and the front arm 10 vertically swing together with vertical swing of the front end of the parallel link mechanism 11. More specifically, the intersection point C5 between the straight line L1 connecting the front and rear fulcrums C1 and C2 of the upper link member 21 to each other and the straight line L2 connecting the front and rear fulcrums C3 and C4 of the lower link member 22 to each other becomes a center of swinging motion, and the front wheel 5 and the front end of the front arm 10 vertically swing.

In FIG. 3, the vertical swing of the front wheel 5 is propagated from the rear ends 10a of the left and right front arms 10 to the left and right bell crank members 32 through the left and right tie rods 34. The bell crank members 32 turns around the fulcrum C6 in a direction of arrow A1, thereby compressing the damper member 33 in the vehicle-width direction, and this suppresses the vertical swing of the front wheel 5.

In FIG. 2, when the brake is applied, a resistance force (reaction force) is applied rearward from a road surface to the front wheel 5. Most of the road surface resistance force at the time of braking is applied to the front arm 10 as a compression load in a length direction (substantially longitudinal direction) of the front arm 10, and the road surface resistance force is propagated from the front arm 10 to the vehicle body frame F through the parallel link mechanism 11. The vehicle body frame F receives the road surface resistance force as a load in the substantially longitudinal direction. Therefore, a large front dive phenomenon which may be caused at the time of braking is not generated unlike a front fork manner.

A force relation applied to the front arm 10 and the like at the time of braking will be described below in detail. In FIG. 2, in reality, the road surface resistance force can be divided into a component force which is applied rearward in parallel with a line connecting the core C0 of the front axle 6 and the rear virtual intersection point C5 to each other, and a component force to push up or down the front arm 10 with respect to the vehicle body frame F. When the virtual intersection point C5 is set higher than a road surface, this upward or downward component force becomes a force to push down the front arm 10. That is, this force becomes a component force to move the front arm 10 in a direction separating away from the head pipe 1. Since most of the resistance force from a road surface becomes a component force which is applied, in parallel, to a line connecting the core C0 of the front axle 6 and the virtual intersection point C5 to each other, this component force is received by the front arm 10 as a compression force applied along the axis L0 and is eventually received as a rearward force applied to the vehicle body frame F. Accordingly, front dive is suppressed.

When the brake is applied, an inertia force is applied to the vehicle body frame F in addition to the road surface resistance force, this inertia force acts as a force to make the vehicle body frame F approach toward the front wheel 5, but since the virtual intersection point C5 is set higher than a road surface, the inertia force is attenuated (canceled) by a component force of the road surface resistance force which tries to push down the front wheel 5. According to this, the front dive phenomenon of the vehicle body frame F caused by the inertia force is suppressed.

Various adjusting operations will be described. It is possible to adjust a height of the two-wheeled motor vehicle by simultaneously adjusting lengths of the left and right tie rods 34. It is possible to correct lateral inclination of the front wheel 5 by individually adjusting lengths of the left and right tie rods 34.

Since influence of front dive is small, it is unnecessary to increase a spring force and a damper force of the suspension mechanism 12 more than necessary to prevent front dive, and it is possible to set characteristics of a suspension mechanism to conform ride quality.

It is possible to appropriately change a lever ratio in the bell crank members 32 by changing various connecting positions in the bell crank members.

[Effects of the Embodiments]

(1) In FIG. 2, since the damper member 33 is disposed along the vehicle-width direction, a size of the vehicle in the longitudinal direction can be reduced. Further, since the damper member 33 is disposed in the vertical space between the head pipe 1 and the front arm 10 as viewed from side, the distance between the damper member 33 and the front arm 10 can be shortened, and it is possible to enhance responsiveness of the damper member 33 to the vertical movement of the front wheel.

(2) Since the damper member 33 is disposed in the vertical space between the head pipe 1 and the front arm 10, a pebble which is flicked during running is less prone to hit the damper member 33. A barycenter of the vehicle does not become low more than necessary, and a large bank angle can be secured.

(3) The damper member 33 is located rearward of the rear end of the front wheel 5 and the head pipe 1. According to this, a distance between the damper member 33 and the front arm 10 can further be shortened, and it is possible to further enhance the responsiveness of the damper member 33.

(4) The front wheel supporting structure for a vehicle includes the parallel link mechanism 11 which supports the rear end 10a of the front arm 10 on the vehicle body frame F, and the bell crank member 32 is connected to the rear end 10a of the front arm 10. Therefore, when the brake is applied, a load applied to the link members 21 and 22 is reduced, the link members can be made thin, and a weight thereof can be reduced.

(5) The front wheel supporting structure for a vehicle further includes one more front arm 10 and one more bell crank member 32, the pair of front arms 10 is respectively disposed on left and right sides of the front wheel supporting structure, the pair of bell crank members 32 is respectively disposed on left and right sides of the front wheel supporting structure, and the left and right bell crank members 32 are connected to left and right ends of the damper member 33. Therefore, it is possible to support left and right sides of the pair of left and right front arms 10 substantially uniformly, rigidity of the front arm 10 is enhanced, and twist can be prevented.

(6) An input end of the bell crank member 32 is located on a more outer side in the vehicle-width direction than both ends of the damper member 33 in the vehicle-width direction. Therefore, the distance from the front arm 10 to the damper member 33 can be shortened, the bell crank member 32 can be operated without interfering with other members, and it becomes easy to secure a swinging stroke of the front arm 10.

(7) The bell crank member 32 and the rear end 10a of the front arm 10 are connected to each other through the substantially vertical tie rod 34. This configuration prevents the front arm 10, the damper member 33 and the bell crank member 32 from interfering with each other when the front arm 10 swings.

(8) In FIG. 2, the damper member 33 is located at a position higher than the exhaust port formed in the front surface of the engine E. This configuration prevents the exhaust pipe and the damper member 33 from interfering with each other.

(9) In FIG. 3, an input side end (lower end) of each of the bell crank members 32 is located on a more outer side in the vehicle-width direction than the turning fulcrum C6 of the bell crank member 32 and an output side end (upper end) of the bell crank member 32, and is located on a more outer side in the vehicle-width direction than an end edge of the damper member 33 in the vehicle-width direction. Therefore, when the vehicle turns and banks, it is possible to easily prevent the input side end of the bell crank member 32 from interfering with other members.

More specifically, when the front wheel 5 moves upward with respect to the swinging fulcrum (C5) of the front arm 10 (when vehicle body sinks), the lower end of the bell crank member 32 turns in a direction of an arrow A1 such that the lower end swells outward in the vehicle-width direction. Therefore, even when the vehicle body banks and turns in a state where the vehicle body sinks, since the bell crank member 32 is located above the vehicle body, it is possible to prevent the input side end (lower end) of the bell crank member 32 from coming into contact with a road surface.

(10) In FIG. 4, the upper end of each of the bell crank members 32 is composed of bifurcated-shaped wall portions 32a which project upward, and the damper member 33 is connected to the bifurcated-shaped wall portions 32a in a state where the an end of damper member 33 in the vehicle-width direction is sandwiched between the bifurcated-shaped wall portions 32a. Therefore, it is possible to prevent the bell crank member 32 and the damper member 33 from interfering with each other when the damper member 33 expands and contracts.

(11) Since the reserve tank 33a of the damper member 33 is disposed in front of and above the damper member 33 in parallel to the damper member 33, space can be saved.

(12) The damper member 33 is fixed to and supported by the vehicle body frame F, and when the handlebars are operated, the damper member 33 does not angularly move together with the steering shaft 8. Therefore, as compared with a structure in which the damper member 33 angularly moves together with the steering shaft 8, it is possible to reduce a driver's force which is required for a steering operation.

(13) A portion of the front arm 10 which is connected to the suspension mechanism 12, i.e., a lower end of the tie rod 34 is located to rearward of the head pipe 1. Therefore, a distance between the front arm 10 and the suspension mechanism 12 can be shortened. Especially, it is possible to further shorten a distance between the damper member 33 and the front arm 10 by connecting the tie rod 34 to the rear end 10a of the front arm 10.

(14) Since the tie rod 34 extends substantially vertically when the front arm 10 does not swing, it is possible to reduce a moving amount of the tie rod 34 in the vehicle-width direction when the front arm 10 swings. For example, if the tie rod 34 is disposed such that it inclines inward in the vehicle-width direction as tending upward when the front arm 10 does not swing, it is possible to suppress an outward moving amount of the tie rod 34 in the vehicle-width direction in a state where the front arm 10 moves most.

(15) Since the pair of left and right upper link members 21 are connected to each other through the cross member 39 which extends in the vehicle-width direction, rigidity can be enhanced, and the left and right sides can go through the same motion.

(16) Since the upper link member 21 and the suspension mechanism 12 are connected to each other at a portion where the cross member 39 is disposed, it is possible to prevent rigidity from being deteriorated.

(17) The pair of left and right upper link members 21 are connected to each other through the cross member 39 which extends in the vehicle-width direction, and the rear ends of the front arms 10 are connected to each other through the cross portion 10c. Therefore, it is possible to uniformly maintain movements of the left and right tie rods 34, and to prevent the damper member 33 from inclining when the front arm 10 swings.

(18) Since the reserve tank 33a is disposed in front of the damper member 33, it is possible to bring the damper member 33 close to the vehicle body frame F, and it is possible to centralize a mass.

(19) In FIG. 2, when the brake is applied, a tire of the front wheel 5 receives a resistance force (reaction force) acting from a road surface rearward with respect to a vehicle body. This resistance force is divided into a component force to compress the front arm 10 in the direction of the axis L0 and a substantially vertical component force to move the front arm 10 downward, as described above. In this embodiment, since the front arm 10 extends substantially in the longitudinal direction, most of the resistance force from a road surface becomes a component force acting rearward toward the axis L0 of the front arm 10 and eventually, when the brake is applied, a force acting rearward from front is applied to the vehicle body frame F. Therefore, as compared with the conventional front fork structure in which most of a resistance force from a road surface is applied in the vertical direction when the brake is applied, it is possible to reduce rigidity of the vehicle body frame F which eventually supports the front arm 10, and a weight of the vehicle body frame F can be reduced.

(20) The front suspension mechanism 12 suppresses the turning motion of the front arm 10. Therefore, as compared with a structure in which turning motion of the link member is suppressed, it is possible to reduce a force in a bending direction applied to the link members 21 and 22, and it is possible to lower the rigidity of the link members 21 and 22 and to reduce their weights.

(21) Positions where the front arm 10 and the link members 21 and 22 are connected to each other are located rearward of the rear end of the front wheel 5. Therefore, it is possible to rearwardly deviate a position of the front suspension mechanism 12 for suppressing the turning motion of the front arm 10 as much as possible, and it is possible to move a barycenter toward the centralization. Positions where the front arm 10 and the link members 21 and 22 are connected to each other are located to rearward of the rear end of the front wheel 5. Therefore, for steering the front wheel, it is unnecessary to form the link members 21 and 22 into curved shapes, and the shapes of the plurality of link members 21 and 22 can be simplified into straight shapes.

(22) Most of a resistance force from a road surface acts toward the axis L0 of the front arm 10. Therefore, to prevent the front dive in which a front portion of a vehicle body sinks down, it is unnecessary to increase the spring force and the damper force of the front suspension mechanism 12. That is, influence of the front dive is small, and it is possible to set the spring force and the damper force especially to enhance ride quality.

(23) Since the front suspension mechanism 12 resiliently supports the rear end of the front arm 10, loads applied to the link members 21 and 22 are reduced, rigidity of the link members 21 and 22 is suppressed, and the vehicle can be made lighter in weight. That is, by resiliently supporting the rear end of the front arm 10, it is possible to bring the main body of the front suspension mechanism 12 close to a center of the vehicle body, or it is possible to reduce, in size, a buffer mechanism which is disposed on a location extending from the main body of the front suspension mechanism 12 to the front arm 10, and the front wheel supporting structure can be simplified.

(24) The axis L0 connecting the core C0 of the front axle 6 and a turning connecting point C1 between the front arm 10 and the upper link member 21 inclines such that the axis L0 projects upward with respect to the horizontal line. Therefore, the front suspension mechanism 12 can absorb energy generated at the time of collision. For example, if an obstacle collides against the front wheel 5 from front, the front arm 10 inclines, and a collision force is divided into a direction of the axis L0 of the front arm 10 and a direction intersecting with the direction of the axis at right angles. In this case, a force acting in a direction intersecting with the direction of the axis at right angles is impact-absorbed by the front suspension mechanism 12, and an impact at the time of collision can be suppressed. A force acting in the direction of the axis L0 is propagated to the vehicle body as a compression load, and it is possible to enhance a resistance against an impact as compared with a case where a bending load is generated.

(25) Since the pair of left and right lower link members 22 is disposed on a more inner side in the vehicle-width direction than the pair of left and right upper link members 21. Therefore, it is possible to reduce leftward and rightward projecting degrees of the lower link members 22, and to increase a bank angle.

(26) Since the tie rod 34 of the front suspension mechanism 12 is connected to the rear end 10a of the front arm 10, the front suspension mechanism 12 can absorb vertical swinging motion of the front wheel 5 without through the parallel link mechanism 11. Accordingly, a large load is not applied to the parallel link mechanism 11 in the vertical direction, and the link members 21 and 22 can be made lighter in weight.

[Other Embodiments]

(1) The present invention can also be applied to a two-wheeled motor vehicle which does not have the link mechanism 11 and in which the front arm 10 is supported directly by the vehicle body frame F.

(2) Although the parallel link mechanism 11 is mounted on the supporting bracket 25 provided in the down tube 3 of the vehicle body frame F in the embodiment, the rear end of the parallel link mechanism 11 may be supported directly by the front end of the engine E supported by the main frame F.

(3) The present invention is not limited to the vehicle including the steering device which utilizes the steering wire. For example, the handlebars-side steering shaft and the wheel-side steering shaft may be connected to each other through a link mechanism which can be folded in the vertical direction, or other structures may be employed. More specifically, a force required for cornering is transmitted from the handlebars to the hub supporting cylinder shaft through a link mechanism which is composed of a plurality of link members connected to a steering shaft such that the link members can angularly move from the steering shaft.

(4) As another modification, the front arm 10 may be formed such that a width thereof in the vertical direction becomes wider rearward as viewed from the side of the vehicle, and front ends of upper and lower link members 21 and 22 are turnably connected to a wide rear end 10a. As another modification, the rear end 10a of the front arm 10 may be formed into a T-shape projecting in the vertical direction as viewed from the side of the vehicle.

(5) As another modification, the rear end portion 10a of the front arm 10 can be formed into an L-shape extending upward as viewed from the side of the vehicle.

(6) Although the parallel link mechanism 11 is mounted on the down tube 3 of the vehicle body frame F in the embodiment, the rear end of the parallel link mechanism 11 may be supported directly by a front end of the engine which is supported by the vehicle body frame F.

(7) A line connecting the core C0 of the front axle 6 of the front arm 10 and the turning connecting point (C1) between the front arm 10 and the link mechanism 11 to each other may be formed such that the line is lowered rearward with respect to the horizontal line. Further, a line which connects the front axle, a front turning connecting point and a rear turning connecting point to one another may be formed into an inverted-V shape.

(8) The link supporting bracket which supports the link members may be fixed to a case of a power unit such as an engine. According to this, rigidity of a link connecting portion in the power unit case need not be (9) Although the front wheel supporting structure includes the pair of left and right front arms and the pair of left and right link members in the embodiment, the front arm and the link member may be provided on only one of the left and right sides.

(10) It is not always necessary that the core O1 of the handlebars-side steering shaft 8 and the core O2 of the wheel-side steering shaft match with each other. In this case, front side peripheries can neatly be simplified, and the head pipe 1 can be made lighter in weight.

(11) The present invention is not limited to the two-wheeled motor vehicle only if the damper member is disposed between the handlebars supporting portion and the front arm, and the present invention can also be applied to vehicles other than the two-wheeled motor vehicle. For example, the present invention can also be applied to a vehicle having front and rear wheels, e.g., a straddle-type vehicle having three or more wheels. Especially, the present invention can preferably be used for a vehicle which corners while inclining its vehicle body.

(12) To prevent muddy water thrown up by the front wheel from splashing toward the suspension mechanism, a mud shield member may be interposed between the front wheel and the suspension mechanism.

(13) The connecting member is not limited to the above-described structure only if vertical swinging motion of the front arm is converted into the lateral movement toward the input end of the damper, and other structures may be employed. For example, a force may be input to only one end of the input portion of the damper instead of its both ends.

(14) A position where the fulcrum is disposed may appropriately be set such that a tensile force is applied to the damper member when the front arm moves upward from its non-swing state, and a compression force is applied to the damper member when the front arm moves downward.

(15) Although the invention has been described in its preferred embodiments with a certain degree of particularity, obviously many changes and variations are possible therein. It is therefore to be understood that the present invention may be practical otherwise than as specifically described herein without departing from the scope and spirit thereof.

What is claimed is:

1. A front wheel supporting structure for a vehicle, comprising:
    a front arm for supporting a front axle, the front arm extending rearward from a front axle supporting portion and being configured to swing in a vertical direction; and
    a suspension mechanism for resiliently suppressing vertical swinging motion of the front arm, the suspension mechanism including:
        a damper member arranged to extend laterally in a vehicle-width direction, the damper member being located under a head pipe for supporting handlebars such that the handlebars can move angularly, the damper member being located above an upper end of the front arm; and
        a connecting member for connecting the front arm and the damper member to each other such that vertical swinging motion of the front arm is converted into lateral expanding and contracting motion of the damper member.

2. The front wheel supporting structure for the vehicle according to claim 1, wherein
    the damper member is located rearward of a front wheel and the head pipe.

3. The front wheel supporting structure for the vehicle according to claim 1, further comprising a link mechanism for supporting a rear end of the front arm on a vehicle body-configuring member, wherein
    the connecting member is connected to the front arm.

4. The front wheel supporting structure for the vehicle according to claim 1, wherein the front arm is a first front arm and the connecting member is a first connecting member, the front wheel supporting structure further comprising a second front arm and a second connecting member, wherein
    the first and second front arms are respectively disposed at left and right sides of the front wheel supporting structure, the first and second connecting members are respectively disposed at left and right sides of the front wheel supporting structure so as to be left and right connecting members, and the left and right connecting members are respectively connected to left and right ends of the damper member.

5. The front wheel supporting structure for the vehicle according to claim 1, wherein
the connecting member is a bell crank member, and an input end of the bell crank member is located at an outer side of the damper member in the vehicle-width direction.

6. The front wheel supporting structure for the vehicle according to claim 1, wherein
the connecting member and the front arm are connected to each other by a tie member extending upward from the front arm.

7. The front wheel supporting structure for the vehicle according to claim 1, further comprising a link mechanism for supporting a rear end of the front arm on a vehicle body-configuring member, wherein
the link mechanism is located rearward of a front wheel, and the damper member is located above the link mechanism.

8. The front wheel supporting structure for the vehicle according to claim 1, wherein the damper member is located above a front wheel.

9. The front wheel supporting structure for the vehicle according to claim 1, wherein the damper member is located at a position which is higher than a position of an engine mounted on the vehicle.

10. The front wheel supporting structure for the vehicle according to claim 1, wherein:
the connecting member and the front arm are connected to each other by a tie member;
the connecting member is a bell crank member; and
a connecting portion between the bell crank member and the tie member is located at an outer side of the damper member in the vehicle-width direction.

11. The front wheel supporting structure for the vehicle according to claim 1, wherein the front arm is a first front arm and the connecting member is a first connecting member, the front wheel supporting structure further comprising a second front arm and a second connecting member, wherein:
the first and second connecting members are bell crank members;
the first and second front arms are respectively disposed at left and right sides of the front wheel supporting structure, the first and second bell crank members are respectively disposed at left and right sides of the front wheel supporting structure so as to be left and right bell crank members, and the left and right bell crank members are respectively connected to left and right ends of the damper member;
a left connecting portion between the left bell crank member and a left tie member is located at a left side of the damper member in the vehicle-width direction, and a right connecting portion between the right bell crank member and a right tie member is located at a right side of the damper member in the vehicle-width direction.

12. The front wheel supporting structure for the vehicle according to claim 1, wherein the connecting member and the front arm are connected to each other by a tie rod extending upwards from the front arm.

13. A front wheel supporting structure for a vehicle, comprising:
left and right front arms for supporting a front axle, the left and right front arms extending rearward from front axle supporting portions and being configured to swing in a vertical direction;
a parallel link mechanism including a pair of upper link members and a pair of lower link members, the parallel link mechanism supporting rear end portions of the left and right front arms on a vehicle body-configuring member; and
a suspension mechanism for resiliently suppressing vertical swinging motion of the left and right front arms;
wherein each of the left and right front arms has an L-shaped configuration when viewed from a lateral side of the vehicle, the L-shaped configuration being formed of:
a main body portion extending rearwardly from a respective one of the front axle supporting portions; and
a rear end portion extending downwardly from the main body portion;
wherein an upper end of the rear end portion of each of the left and right front arms is rotatably connected to a front end of a respective one of the pair of upper link members;
wherein a lower end of the rear end portion of each of the left and right front arms is rotatably connected to a front end of a respective one of the pair of lower link members;
wherein the suspension mechanism includes a damper member arranged in a vehicle-width direction, and left and right bell crank members;
wherein the damper member is located under a head-pipe rotatably supporting a steering shaft and is located above the left and right front arms;
wherein the left bell crank member is located at a left end of the damper member, and connects the left end of the damper member to an upper end of the rear end portion of the left front arm;
wherein the right bell crank member is located at a right end of the damper member, and connects the right end of the damper member to an upper end of the rear end portion of the right front arm; and
wherein the left and right bell crank members convert vertical swinging motion of the left and right front arms into lateral expanding and contracting motion of the damper member.

* * * * *